(12) United States Patent
Yokotani et al.

(10) Patent No.: US 7,640,819 B2
(45) Date of Patent: Jan. 5, 2010

(54) INTERNAL COMBUSTION ENGINE

(75) Inventors: Hitoshi Yokotani, Saitama (JP);
Hiroatsu Inui, Saitama (JP); Shinichiro Keyaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 11/699,369

(22) Filed: Jan. 30, 2007

(65) Prior Publication Data
US 2007/0180948 A1   Aug. 9, 2007

(30) Foreign Application Priority Data
Jan. 31, 2006   (JP) ............................. 2006-022527

(51) Int. Cl.
*F16H 59/00* (2006.01)
*F16H 61/00* (2006.01)
*F16H 63/00* (2006.01)
*H02K 7/116* (2006.01)
*B60K 17/00* (2006.01)

(52) U.S. Cl. ..................... 74/335; 74/421 A; 180/374

(58) Field of Classification Search ................ 74/335, 74/421 A; 180/230, 374
See application file for complete search history.

(56) References Cited

U.S. PATENT DOCUMENTS

| 4,335,318 | A | * | 6/1982 | Mabuchi et al. ............... 290/31 |
| 6,443,275 | B1 | * | 9/2002 | Hori et al. ................... 192/3.33 |
| 6,494,806 | B2 | * | 12/2002 | Tsukada et al. ................ 476/8 |
| 7,380,630 | B2 | * | 6/2008 | Yamada et al. .............. 180/230 |
| 2005/0239585 | A1 | * | 10/2005 | Nishida et al. ................ 474/19 |

FOREIGN PATENT DOCUMENTS

JP   2001-108093 A   4/2001

* cited by examiner

*Primary Examiner*—Tisha D Lewis
(74) *Attorney, Agent, or Firm*—Birch, Stewart, Kolasch & Birch, LLP (57) ABSTRACT

An internal combustion engine including a transmission for transmitting power from a crankshaft to an output shaft through speed change, with the speed change in the transmission being performed by the driving of a speed change electric motor through a speed change drive mechanism, wherein power transmission control means for controlling the transmission of power from the crankshaft to the transmission is provided at one end of the crankshaft, and at least a part of the speed change electric motor and the speed change drive mechanism is disposed on the outside of the power transmission control means. This configuration of the internal combustion engine is reduced in size because of the layout of the speed change drive mechanism and the speed change electric motor.

18 Claims, 5 Drawing Sheets

INTERNAL COMBUSTION ENGINE

CROSS-REFERENCE TO RELATED APPLICATION

The present application claims priority under 35 U.S.C. §119 to Japanese Patent Application No. 2006-022527, filed Jan. 31, 2006, the entire contents of which are hereby incorporated by reference.

BACKGROUND OF THE INVENTION

1. Field of the Invention

The present invention relates to an internal combustion engine provided with a speed change electric motor.

2. Description of Background Art

As an internal combustion engine in which speed change in a transmission is performed by the driving of a speed change electric motor through a speed change drive mechanism, there is the example disclosed in Japanese Patent Laid-Open No. 2001-108093.

The speed change electric motor and the speed change drive mechanism in the internal combustion engine disclosed in Japanese Patent Laid-Open No. 2001-108093 are located on the right side of a torque converter provided at a front end portion of a crankshaft so as not to overlap with the torque converter in the axial direction, and is disposed between the crankshaft and an output shaft, so that the distance between the crankshaft and the output shaft is large due to the presence of the speed change electric motor and the speed change drive mechanism.

In addition, neither of the plane containing a main shaft and a counter shaft and the plane containing the motor drive shaft of the speed change electric motor and a shaft spindle is parallel to the plane containing the crankshaft and the output shaft; particularly, the main shaft and the shift spindle are remote from the plane containing the crankshaft and the output shaft.

Furthermore, in the speed change drive mechanism, two idle gear shafts are provided for the purpose of enlarging the speed reduction ratio and earning torque, so that the number of component parts is large.

When it is intended to cope with the purpose by using only one idle gear shaft, a large diameter gear must be provided for earning torque; in this case, in order to prevent the large diameter gear from interfering with the output shaft, the output shaft must be set farther from the crankshaft, which hampers a reduction in the size of the internal combustion engine.

SUMMARY AND OBJECTS OF THE INVENTION

The present invention has been made in consideration of the above-mentioned points. Accordingly, it is an object of the present invention to provide an internal combustion engine capable of being reduced in size by making a contrivance as to the layout of a speed change drive mechanism including a speed change electric motor.

In order to attain the above object, according to a first aspect of the present invention, an internal combustion engine including a transmission for transmitting power from a crankshaft to an output shaft through speed change, with the speed change in the transmission being performed by the driving of a speed change electric motor through a speed change drive mechanism, wherein power transmission control means for controlling the transmission of power from the crankshaft to the transmission is provided at one end of the crankshaft, and at least a part of the speed change electric motor and the speed change drive mechanism is disposed on the outside of the power transmission control means.

According to a second aspect of the present invention, the speed change drive mechanism includes an idle gear shaft integrally and coaxially provided with a large diameter gear and a small diameter gear which are operative to transmit the rotational power of a motor drive shaft of the speed change drive mechanism to a shift spindle through speed reduction; the transmission includes a main shaft to which power is inputted by the power transmission control means, and a counter shaft for transmitting the rotational power of the main shaft to the output shaft; and the arrangement of the motor drive shaft, the idle gear shaft and the shift spindle and the arrangement of the main shaft and the counter shaft are so set as to avoid the area between the crankshaft and the output shaft.

According to a third aspect of the present invention, such a positional relationship is adopted that the idle gear shaft is substantially contained in the plane containing the motor drive shaft and the shift spindle, and the plane containing the motor drive shaft and the shift spindle is located substantially in parallel to and on the lower side of the plane containing the crankshaft and the output shaft; and the plane containing the main shaft and the counter shaft is located substantially in parallel to and on the upper side of the plane containing the crankshaft and the output shaft.

According to a forth aspect of the present invention, the idle gear shaft of the speed change drive mechanism has the large diameter gear located on the outer side and the small diameter gear located on the inner side; and the large diameter gear on the outer side is meshed with a drive gear provided on the motor drive shaft projecting to the inside of the speed change electric motor, and the small diameter gear on the inner side is meshed with a sector gear fitted to an end portion of the shift spindle.

EFFECTS OF THE INVENTION

According to the first aspect of the present invention, at least a part of the speed change electric motor and the speed change drive mechanism is disposed on the outside of the power transmission control means. Therefore, the speed change electric motor and the speed change drive mechanism are disposed so as to avoid the power transmission control means in the axial direction but not to avoid the power transmission control means in directions perpendicular to the axial direction. As a result, it is unnecessary to dispose the output shaft remote from the crankshaft in order to arrange the speed change electric motor and the speed change drive mechanism, so that it is possible to dispose the output shaft close to the crankshaft and thereby to contrive a reduction in the size of the internal combustion engine.

According to the second aspect of the present invention, the arrangement of the motor drive shaft, the idle gear shaft and the shift spindle and the arrangement of the main shaft and the counter shaft are so set as to avoid the area between the crankshaft and the output shaft. This makes it possible to dispose the crankshaft and the output shaft close to each other, and thereby to contrive a further reduction in the size of the internal combustion engine.

According to the third aspect of the present invention, such a positional relationship is adopted that the idle gear shaft is substantially contained in the plane containing the motor drive shaft and the shift spindle, this plane is disposed substantially in parallel to and on the lower side of the plane containing the crankshaft and the output shaft, and the plane containing the main shaft and the counter shaft is disposed substantially in parallel to and on the upper side of the plane containing the crankshaft and the output shaft. Therefore, the motor drive shaft, the idle gear shaft and the shift spindle can be disposed on the lower side of and close to the plane containing the crankshaft and the output shaft in the condition where the crankshaft and the output shaft are close to each other, while the main shaft and the counter shaft can be disposed on the upper side of and close to this plane. As a result, these shafts can be laid out collectively and concentratedly, whereby a further reduction in the size of the internal combustion engine can be contrived.

Since the main shaft and the counter shaft in the transmission which are high in rotating speed and need a large amount of a lubricating oil are laid out on the upper side, it is possible to achieve good lubrication of the internal combustion engine.

In addition, since the idle gear shaft and the shift spindle which are comparatively low in rotating speed are laid out on the lower side relative to the plane containing the crankshaft and the output shaft, i.e., on the side where the shafts are immersed in the lubricating oil, it is possible to suppress friction to a low level.

According to the forth aspect of the present invention, the large diameter gear on the outer side is meshed with the drive gear provided on the motor drive shaft projecting to the inside of the speed change electric motor, and the small diameter gear on the inner side is meshed with the sector gear fitted to an end portion of the shift spindle. Therefore, the shift spindle can be made as short as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below, based on FIGS. 1 to 5.

The internal combustion engine 10 according to this invention is a water-cooled type single-cylinder four-stroke-cycle internal combustion engine, and is mounted on a four-wheel all-terrain vehicle in a vertical mode, with its crankshaft 11 directed in the front-rear direction.

Incidentally, the front, rear, left and right are determined as viewed from a person facing in the forward running direction of the vehicle.

Figure 1:
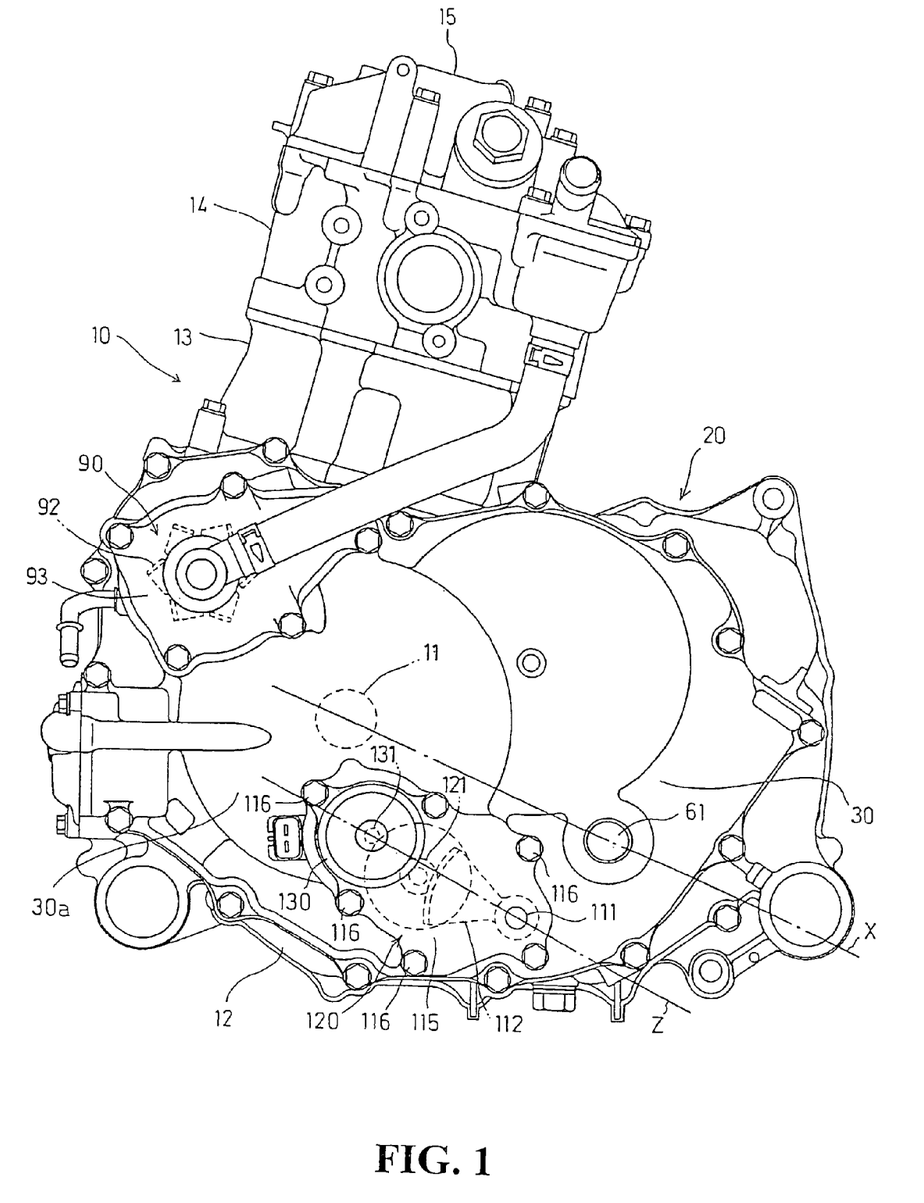
FIG. 1 is a front view of an internal combustion engine according to an embodiment of the present invention.

Referring to FIG. 1, which is a front view of the internal combustion engine 10, the internal combustion engine 10 includes a cylinder block 13, a cylinder head 14, and a cylinder head cover 15 sequentially stacked on a crankcase 12, and is erected in the state of being slightly inclined to the left side.

The crankcase 12 has a front-rear split structure composed of a front crankcase half 12F and a rear crankcase half 12R which are split to the front and rear sides at a plane orthogonal to the crankshaft 11 directed in the front-rear direction of the vehicle and which contain also a transmission 40 disposed on the left side (the right side in FIGS. 1 and 2) of the crankshaft 11.

Figure 2:
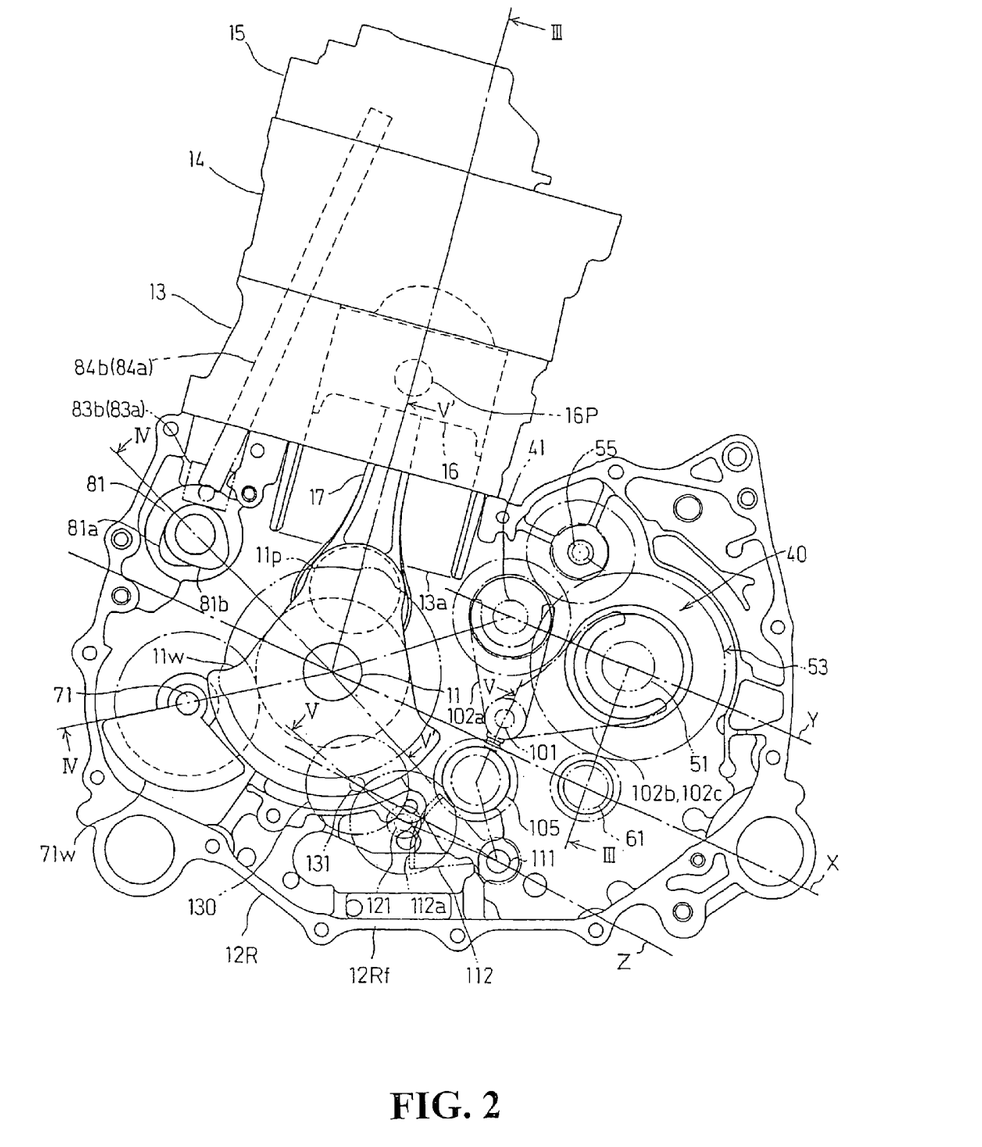
FIG. 2 is a front view of the internal combustion engine 10, where a front crankcase half and the like are omitted.

FIG. 2 is a front view in which the front crankcase half 12F and the like are omitted, of the internal combustion engine 10, and shows a mating surface 12Rf of the rear crankcase half 12R.

A cylinder sleeve 13a extending from the cylinder block 13 is fitted into the crankcase 12, and a piston 16 is slidably fitted in the cylinder sleeve 13a.

A connecting rod 17 makes connection between a crank pin 11p, bridgingly disposed between a pair of front and rear crank webs 11w, 11w of the crankshaft 11, and a piston pin 16p provided on the piston 16.

Figure 3:
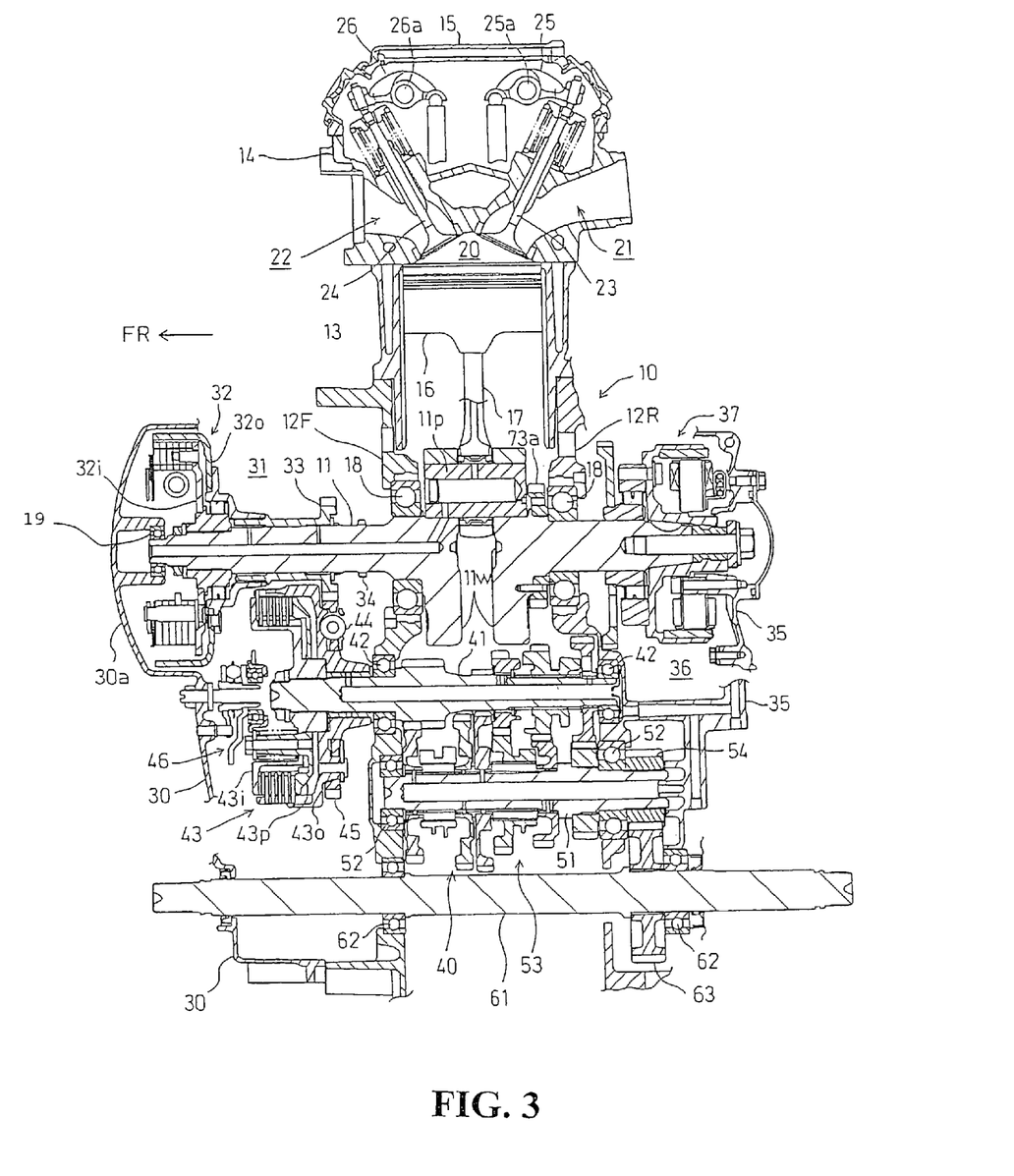
FIG. 3 is a sectional view taken along line III-III of FIG. 2.

Referring to FIG. 3, a combustion chamber 20 is formed between a top surface of the piston 16 and a ceiling surface, facing to the top surface, of the cylinder head 14. From the combustion chamber 20, an intake port 21 extends rearward, while an exhaust port 22 extends forward.

An opening, opening into the combustion chamber 20, of the intake port 21 is opened and closed by an intake valve 23, while an opening, opening into the combustion chamber 20, of the exhaust port 22 is opened and closed by an exhaust valve 24.

Rocker arms 25 and 26 for driving the intake valve 23 and the exhaust valve 24 are provided inside the cylinder head cover 15, in the state of being rotatably supported on rocker arm shafts 25a and 26a, respectively.

As shown in FIG. 3, the crankshaft 11 is rotatably supported on the front crankcase half 12F and the rear crankcase half 12R through main bearings 18, 18 on the front and rear sides of the crank webs 11w, 11w.

A front cover 30 is coveringly connected to the front crankcase half 12F from the front side, to define a front accommodating chamber 31 between itself and the front crankcase half 12F.

A front end portion of the crankshaft 11 extending forward from the main bearing 18, retained by the front crankcase half 12F, into the front accommodating chamber 31 is rotatably supported on the front cover 30 through a bearing 19.

The crankshaft 11 in the front accommodating chamber 12 is provided with a starting clutch 32, which is power transmission control means, in the vicinity of a front end portion thereof.

The starting clutch 32 is a centrifugal type clutch, wherein a clutch inner 32i is attached to a portion near the front end of the crankshaft 11, and a clutch outer 32o is supported on a primary drive gear 33, supported on the crankshaft 11, through a one-way clutch so as to be permitted to perform relative rotation in only one direction. Power is transmitted from the primary drive gear 33 to the transmission 40 side.

Incidentally, a drive sprocket 34 constituting a valve-operating power transmission mechanism for rotatingly driving a camshaft 81 which will be described later is formed on the crankshaft 11, at a position between the primary drive gear 33 and the main bearing 18.

The rear side of the rear crankcase half 12R is covered by a rear cover 35 to form a rear accommodating chamber 36, and the crankshaft 11 is provided with an AC generator 37 and the like in the rear accommodating chamber 36.

A main shaft 41 of the transmission 40 is disposed in parallel to the crankshaft 11 on the skewly left upper side of the crankshaft 11 (see FIG. 2), and is rotatably supported on the front crankcase half 12F and the rear crankcase half 12R through bearings 42, 42.

A speed change clutch 43 is provided at a front end portion of the main shaft 41 extending forward from the bearing 42, retained by the front crankcase half 12F, into the front accommodating chamber 31.

The speed change clutch 43 is a multiple-disk friction type clutch, wherein a clutch inner 43i is attached to the front end of the main shaft 41, whereas a clutch outer 43o is rotatably supported on the main shaft 41, and a pressure plate 43p is interposed between the clutch inner 43i and the clutch outer 43o. The pressure plate 43p presses or releases the stack of a plurality of clutch disks rotated as one body with the clutch outer 43o and a plurality of friction disks rotated as one body with the clutch inner 43i, whereby power transmission is controlled.

Clutch operating means 46 for operating the pressure plate 43p is disposed on the front side of the main shaft 41.

The clutch outer 43o is provided with a primary driven gear 45, with a damper spring 44 therebetween, and the above-mentioned primary drive gear 33 and the primary driven gear 45 are in mesh with each other. Therefore, when the above-mentioned starting clutch 33 is put into the ON (connection) position and the rotation of the crankshaft 11 is transmitted to the primary drive gear 33, rotational power is transmitted through the primary driven gear 45 and the damper spring 44 to the clutch outer 43o of the speed change clutch 43, and, when the speed change clutch 43 is put into the ON (connection) position, the main shaft 41 is rotated together with the clutch inner 43i.

The starting clutch 32 is located on the front side relative to the speed change clutch 43, and is disposed close to a front surface of the speed change clutch 43 so as to partly overlap with the latter as viewed along the axial direction. By this configuration, the front-rear length of the crankshaft 11 is made as short as possible, and the axis-to-axis distance of the crankshaft 11 and the main shaft 41 is also made shorter, whereby a reduction in the size of the internal combustion engine 10 is contrived.

A counter shaft 51 is disposed on the further left side and on the skewly lower side of the main shaft 41 in parallel to the main shaft 41 (see FIG. 2), and is rotatably supported on the front crankcase half 12F and the rear crankcase half 12R through bearings 52, 52 (see FIG. 3).

As shown in FIG. 3, a speed change gear train group 53, which is a group of gear trains for setting speed change stages is configured between the main shaft 41 and the counter shaft 51.

An output shaft 61 is disposed on the lower side and on the slightly right side of the counter shaft 51 (see FIG. 2), and the output shaft 61 is rotatably supported on the front crankcase half 12F and the rear crankcase half 12R through bearings 62, 62.

A speed reduction drive gear 54 is fitted onto the rear end, projecting rearward from the crank chamber into the rear accommodating chamber 36, of the counter shaft 51. A speed reduction driven gear 63 fitted onto the output shaft 61 disposed in parallel to the counter shaft 51 is meshed with the speed reduction drive gear 54, whereby power reduced in speed is transmitted to the output shaft 61.

The output shaft 61 extends forwards and rearwards to penetrate the front cover 30 and the rear cover 35 and to project to the exterior, and the rotation of the front and rear ends thereof is served to the driving of front wheels and rear wheels of the vehicle.

Referring to FIG. 2, assuming a plane X containing the crankshaft 11 (its center axis) and the output shaft 61 (its center axis), the plane X is inclined to the left lower side, and the main shaft 41 and the counter shaft 51 are on the upper side of this plane. Assuming a plane Y containing the main shaft 41 (its center axis) and the counter shaft 51 (its center axis), the plane Y is also inclined to the left lower side, and is substantially parallel to the plane X.

Incidentally, a reverse shaft 55 is disposed on the upper side relative to the plane Y, so as to make selective gear meshing with the gears on the main shaft 41 and the counter shaft 51.

Figure 4:
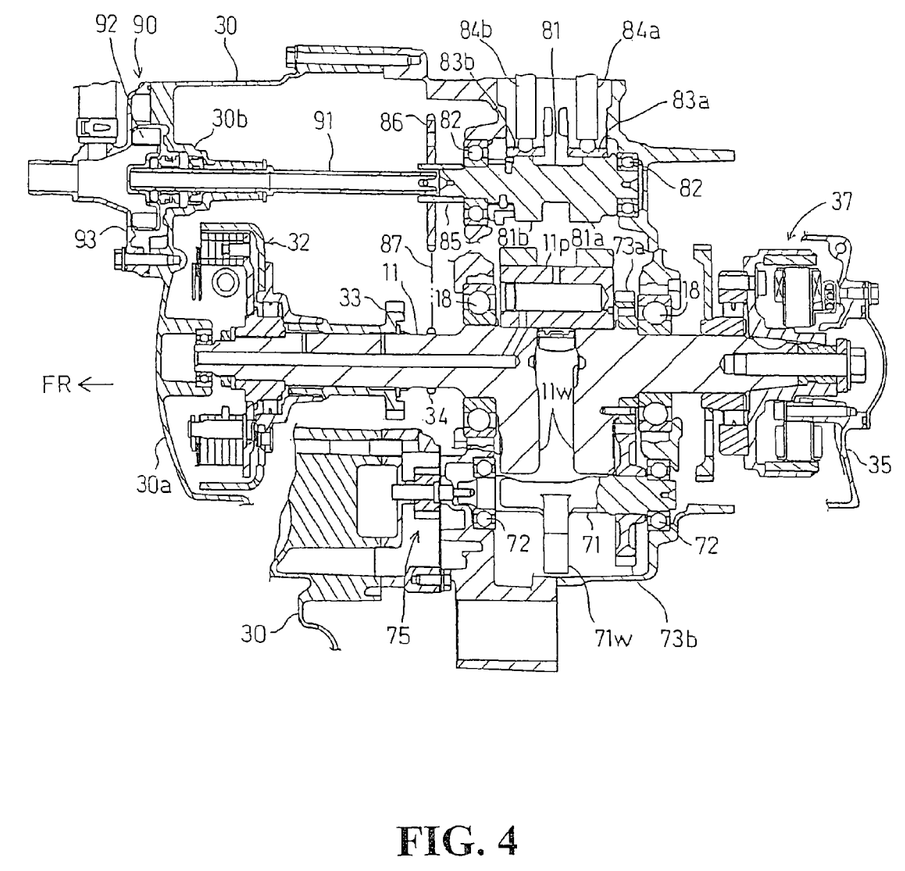
FIG. 4 is a sectional view taken along line IV-IV of FIG. 2.

A balancer shaft 71 parallel to the crankshaft 11 is located on the right side (the left side in FIG. 2) and on the slightly lower side of the crankshaft 11 and on the lower side relative to the plane X. Referring to FIG. 4, the balancer shaft 71 is supported at both its ends on the front crankcase half 12F and the rear crankcase half 12R through bearings 72, 72.

A balancer weight 71w formed at the center of the balancer shaft 71 is located between the front and rear crank webs 11w, 11w of the crankshaft 11. A driven gear 73b is fitted on a rear portion of the balancer shaft 71, and is meshed with a drive gear 73a fitted on the crankshaft 11 (see FIG. 4).

Incidentally, an oil pump 75 is provided on the front side of the balancer shaft 71.

A valve-operating camshaft 81 parallel to the crankshaft 11 is disposed on the skewly right upper side of the crankshaft 11 and on the upper side relative to the plane X (see FIG. 2). The camshaft 81 is rotatably supported at both its end on the front crankcase half 12F and the rear crankcase half 12R through bearings 82, 82 (see FIG. 4).

Cam followers 83a and 83b slid up and down in abutment with cam lobes 81a and 81b of the cam shaft 81 bear the lower ends of push rods 84a and 84b for transmitting a driving force to the above-mentioned rocker arms 25 and 26 inside the cylinder head cover 15.

As shown in FIG. 4, a link sleeve 85 provided with a driven sprocket 86 is fitted on a front end portion, projecting forward from the front crankcase half 12F, of the camshaft 81. A chain 87 (see the two-dotted chain line in FIG. 4) is wrapped around the drive sprocket 34 formed on the crankshaft 11 and the driven sprocket 86, and the rotation of the crankshaft 11 is transmitted to the camshaft 81 through the chain 87.

A water pump 90 driven by the camshaft 81 is provided on the front cover 30 on the front side of the camshaft 81.

As shown in FIG. 4, the water pump 90 has a water pump body part 30b formed in continuation with the clutch cover part 30a, covering the front side of the starting clutch 32, of the front cover 30. A pump drive shaft 91 located on the front side of and linked through the link sleeve 85 to the camshaft 81 and rotated as one body with the camshaft 81 is fitted into the water pump body part 30b from the rear side. An impeller 92 is fitted to an end portion, projecting forward beyond the water pump body part 30b, of the pump drive shaft 91, and the impeller 92 is covered with a water pump cover 93 on the front side thereof.

As shown in FIG. 4, the water pump 90 is located on the front side (on the outside) along a front surface of the starting clutch 32 so as to partly overlap with the latter as viewed in the axial direction. By this configuration, the forward bulging of the water pump 90 is reduced, and the pump drive shaft 91 and the camshaft 81 are disposed close to the crank shaft 11, whereby a reduction in the size of the internal combustion engine 10 is contrived.

In addition, since the water pump 90 is disposed on the outside of the starting clutch 32, it is excellent in maintainability.

A speed change drive mechanism 100 for driving the above-mentioned transmission 40 is provided on the lower side of the crankshaft 11 and the main shaft 41.

Figure 5:
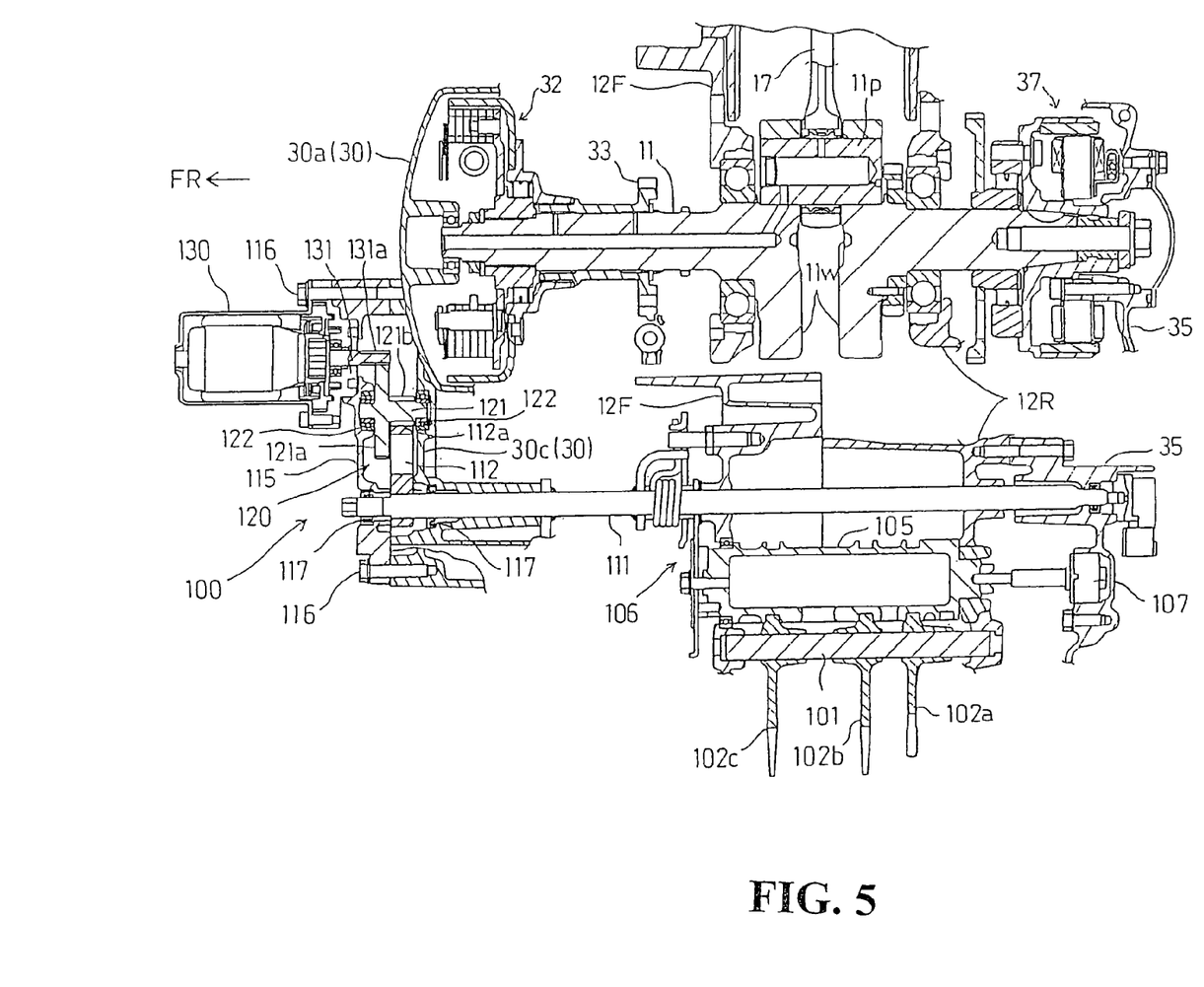
FIG. 5 is a sectional view taken along line V-V and line V'-V' of FIG. 2.

Referring to FIG. 2, a guide shaft 101 is disposed at a position on the lower side of the main shaft 41 and in proximity of the upper surface of the plane X, in parallel to the main shaft 41 and the counter shaft 51, in the state of being supported at both its ends on the front crankcase half 12F and the rear crankcase half 12R (see FIG. 5). On the opposite side of the guide shaft 101 with respect to the plane X, a shift drum 105 is rotatably supported on the front crankcase half 12F and the rear crankcase half 12R.

As shown in FIG. 5, shift pins of shift forks 102a, 102b and 102c slidably supported on the guide shaft 101 are fitted in three shift grooves formed in the outer peripheral surface of the shift drum 105. The shift fork 102a moved in the axial direction while being guided by the shift groove attendant on the turning of the shift drum 105 moves the gear on the main shaft 41, whereas the shift forks 102b and 102c move the gears on the counter shaft 51, whereby the combination of the gears meshed with each other is changed, so as to change speed.

A shift spindle 111 is disposed on the lower side and on the slightly left side of the shift drum 105 (see FIG. 2).

As shown in FIG. 5, the shift spindle 111 is long in the front-rear direction, and penetrates the front crankcase half 12F and the rear crankcase half 12R and, further, the front cover 30 and the rear cover 35.

Shift transmitting means 106 is interposed between the shift spindle 111 and the shift drum 105 so that the turning of the shift spindle 111 turns the shift drum 105 by a required angle, through the shift transmitting means 106.

Incidentally, the turning angle of the shift drum 105 is detected by a shift position detector 107 provided on the rear side of and coaxially with the shift drum 105.

Referring to FIG. 1, in the area ranging to the left side (the right side in FIG. 1) and skewly downwards (substantially in parallel to the plane X) from a lower portion of the clutch cover part 30a, covering the front side of the starting clutch 32, of the front cover 30 to the shift spindle 111, a gear case part 30c (see FIG. 5) is formed at the front surface of the front cover 30. A speed reduction gear mechanism 120 is disposed at the gear case part 30c, and the speed reduction gear mechanism 120 is covered with a gear cover 115 on the front side at the gear case part 30c.

The gear cover 115 is attached to the gear case part 30c of the front cover 30 by a plurality of bolts 116.

Referring to FIGS. 1 and 5, a right upper half of the gear case part 30c corresponds to the front surface of the clutch cover part 30a of the front cover 30. A speed change electric motor 130 is attached from the front side to the front surface of the right upper half of the gear cover 115 covering the front side of the gear case part 30c.

Some of the bolts 116 co-fasten the speed change electric motor 130 together with the gear cover 115.

A motor drive shaft 131, projecting rearward from the gear cover 115, of the speed change electric motor 130 is provided with a small diameter drive gear 131a at a rear end portion thereof.

The above-mentioned shift spindle 111 penetrates both the front cover 30 and the gear cover 115, with seal members 117, 117 therebetween. A fan-shaped gear shift arm 112 is fitted to the shift spindle 111 at a position between the front cover 30 and the gear cover 115.

The gear shift arm 112 has a fan-shaped pivotal portion fitted to the shift spindle 111, and is provided with a large diameter gear 112a at an outer circular arc portion thereof.

Referring to FIG. 2, an idle gear shaft 121 is provided at a roughly middle position between the motor drive shaft 131 of the speed change drive motor 130 and the shift spindle 111, with both its ends rotatably supported on the front cover 30 and the gear cover 115 through bearings 122, 122 (see FIG. 5).

Therefore, assuming a plane Z containing the motor drive shaft 131 (its center axis) and the shift spindle 111 (its center axis), such a positional relationship is adopted that the idle gear shaft 121 is substantially contained in the plane Z.

The plane Z is substantially parallel to the plane X containing the crankshaft 11 and the output shaft 61, and is on the lower side of the plane X.

The idle gear shaft 121 is integrally provided with a large diameter gear 121a and a small diameter gear 121b arranged on the front and rear sides.

The large diameter gear 121a on the front side of the idle gear shaft 121 is meshed with the drive gear 131a of the motor drive shaft 131, whereas the small diameter gear 121b on the rear side is meshed with the large diameter gear 112a of the gear shift arm 112 of the shift spindle 111.

Therefore, when the speed change electric motor 130 is driven and the drive shaft 131 is rotated, the rotational power is transmitted to the shift spindle 111 through speed reduction via the idle gear shaft 121.

The rotation of the shift spindle 111 turns the shift drum 105 by a required angle through the shift transmitting means, as mentioned above, so as to slide the shift forks 102a, 102b and 102c and to change the combination of the gears meshed with each other in the speed change gear train group 53, whereby speed change in the transmission 40 is performed.

The speed reduction gear mechanism 120 of the speed change drive mechanism 100 is configured as above-described. A part of the speed reduction gear mechanism 120, specifically, the idle gear shaft 121 and the speed change electric motor 130, are located on the front side of the clutch cover part 30a; to be more specific, they are located on the front side (outside) in the axial direction of the starting clutch 32 at such positions as to overlap with the latter.

Therefore, it is unnecessary to dispose the output shaft 61 remoter from the crankshaft 11 in order to arrange the speed change electric motor 130 and the idle gear shaft 121, and a reduction in the size of the internal combustion engine can be contrived by laying out the output shaft 61 closer to the crankshaft 11.

In addition, since the arrangement of the motor drive shaft 131, the idle gear shaft 121 and the shift spindle 111 (roughly on the plane Z) and the arrangement of the main shaft 41 and the counter shaft 51 (the plane Y) are set in parallel to the arrangement of the crankshaft 11 and the output shaft 61 (on the plane X) so as to avoid the area between the crankshaft 11 and the output shaft 61, it is possible to lay out the crankshaft 11 and the output shaft 61 closer to each other and thereby to contrive a further reduction in the size of the internal combustion engine.

Further, since the motor drive shaft 131, the idle gear shaft 121 and the shift spindle 111 can be laid out on the lower side of and closer to the plane X containing the crankshaft 11 and the output shaft 61, in the condition where the crankshaft 11 and the output shaft 61 are set close to each other, and the main shaft 41 and the counter shaft 51 can be laid out on the upper side of and closer to the plane X, the shafts can be arranged collectively and concentratedly, whereby a further reduction in the size of the internal combustion engine can be realized.

By the configuration wherein the main shaft 41 and the counter shaft 51 in the transmission 40 which are high in rotating speed and need a large amount of the lubricating oil are laid out on the upper side, it is possible to achieve favorable lubrication of the internal combustion engine 10.

In addition, by the configuration wherein the idle gear shaft 121 and the shift spindle 111 which are comparatively low in rotating speed are laid out on the lower side relative to the plane X containing the crankshaft 11 and the output shaft 61, i.e., on the side where the shafts are immersed in the lubricating oil, it is possible to suppress friction to a low level.

Since only the idle gear shaft 121 is present between the motor drive shaft 131 and the shift spindle 111, the number of component parts is small, which contribute to reduction in the size of the internal combustion engine.

Furthermore, by laying out the large diameter gear 121a of the idle gear shaft 121 on the front side (the outside) of the starting clutch 32, it is possible to enlarge the diameter of the large diameter gear 121a while avoiding interference thereof with other shafts. Therefore, it is possible to enhance the speed reduction ratio and thereby to secure a sufficiently high torque, even with a small-sized speed change electric motor 131.

Since the large diameter gear 121a on the front side (the outer side) is meshed with the drive gear 131a of the motor drive shaft 131 projecting to the inside of the speed change electric motor 130 and the small diameter gear 121b on the inner side is meshed with the gear shift arm 112 fitted onto an end portion of the shift spindle 111, it is possible to somewhat suppress the forward projection of the shift spindle 111 and thereby to make the shift spindle 111 as short as possible, which contributes to reduction in the size of the internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
    a transmission for transmitting power from a crankshaft to an output shaft through speed change, with the speed change in said transmission being performed by the driving of a speed change electric motor through a speed change drive mechanism,
    wherein power transmission control means for controlling the transmission of power from said crankshaft to said transmission is provided at one end of said crankshaft, and
    at least a part of said speed change electric motor and said speed change drive mechanism is disposed on an outside of said power transmission control means,
    wherein said speed change drive mechanism includes an idle gear shaft integrally and coaxially provided with a large diameter gear and a small diameter gear which are operative to transmit rotational power of a motor drive shaft of said speed change drive mechanism to a shift spindle through speed reduction;
    said transmission includes a main shaft to which power is inputted by said power transmission control means, and a counter shaft for transmitting the rotational power of said main shaft to said output shaft; and
    an arrangement of said motor drive shaft, said idle gear shaft and said shift spindle and an arrangement of said main shaft and said counter shaft are so set as to avoid an area between said crankshaft and said output shaft.

2. The internal combustion engine as set forth in claim 1, wherein such a positional relationship is adopted that said idle gear shaft is substantially contained in a plane containing said motor drive shaft and said shift spindle, and the plane containing said motor drive shaft and said shift spindle is located substantially in parallel to and on a lower side of a plane containing said crankshaft and said output shaft; and
    a plane containing said main shaft and said counter shaft is located substantially in parallel to and on an upper side of the plane containing said crankshaft and said output shaft.

3. The internal combustion engine as set forth in claim 1, wherein said idle gear shaft of said speed change drive mechanism has said large diameter gear located on an outer side and said small diameter gear located on an inner side; and
    said large diameter gear on the outer side is meshed with a drive gear provided on said motor drive shaft projecting to an inside of said speed change electric motor, and said small diameter gear on the inner side is meshed with a sector gear fitted to an end portion of said shift spindle.

4. The internal combustion engine as set forth in claim 1, wherein when the internal combustion engine is viewed in an axial direction of the crankshaft, the speed change electric motor is seen to overlap the power transmission control means.

5. The internal combustion engine as set forth in claim 1, wherein the speed change drive mechanism is disposed lower than the crankshaft and the transmission.

6. The internal combustion engine as set forth in claim 1, wherein the speed change drive mechanism is provided on a lower side of the crankshaft and the main shaft.

7. The internal combustion engine as set forth in claim 1, wherein a forward end of the shift spindle is disposed rearwardly of the speed change electric motor.

8. The internal combustion engine as set forth in claim 1, wherein the large diameter gear on the idle gear shaft is disposed forwardly with respect to the power transmission control means.

9. The internal combustion engine as set forth in claim 3, wherein the large diameter gear on the idle gear shaft is disposed forwardly with respect to the outer side of the power transmission control means.

10. An internal combustion engine comprising:
    a speed change drive mechanism including a speed change electric motor; and
    a transmission for transmitting power from a crankshaft to an output shaft through speed change, with the speed change in said transmission being performed by the driving of the speed change electric motor through the speed change drive mechanism; and
    power transmission control means for controlling the transmission of power from said crankshaft to said transmission, the power transmission control means being provided at one end of said crankshaft,
    wherein at least a part of said speed change electric motor and said speed change drive mechanism is disposed forwardly with respect to said power transmission control means,
    wherein said speed change drive mechanism includes an idle gear shaft integrally and coaxially provided with a large diameter gear and a small diameter gear which are operative to transmit rotational power of a motor drive shaft of said speed change drive mechanism to a shift spindle through speed reduction;

said transmission includes a main shaft to which power is inputted by said power transmission control means, and a counter shaft for transmitting the rotational power of said main shaft to said output shaft; and an arrangement of said motor drive shaft, said idle gear shaft and said shift spindle and an arrangement of said main shaft and said counter shaft are so set as to avoid an area between said crankshaft and said output shaft.

11. The internal combustion engine as set forth in claim 10, wherein such a positional relationship is adopted that said idle gear shaft is substantially contained in a plane containing said motor drive shaft and said shift spindle, and the plane containing said motor drive shaft and said shift spindle is located substantially in parallel to and on a lower side of a plane containing said crankshaft and said output shaft; and a plane containing said main shaft and said counter shaft is located substantially in parallel to and on an upper side of the plane containing said crankshaft and said output shaft.

12. The internal combustion engine as set forth in claim 10, wherein said idle gear shaft of said speed change drive mechanism has said large diameter gear located on an outer side and said small diameter gear located on an inner side; and said large diameter gear on the outer side is meshed with a drive gear provided on said motor drive shaft projecting to the inside of said speed change electric motor, and said small diameter gear on the inner side is meshed with a sector gear fitted to an end portion of said shift spindle.

13. The internal combustion engine as set forth in claim 10, wherein when the internal combustion engine is viewed in an axial direction of the crankshaft, the speed change electric motor is seen to overlap the power transmission control means.

14. The internal combustion engine as set forth in claim 10, wherein the speed change drive mechanism is disposed lower than the crankshaft and the transmission.

15. The internal combustion engine as set forth in claim 10, wherein the speed change drive mechanism is provided on a lower side of the crankshaft and the main shaft.

16. An internal combustion engine comprising:
a speed change drive mechanism;
a speed change electric motor; and
a transmission for transmitting power from a crankshaft to an output shaft through speed change, with the speed change in said transmission being performed by the driving of the speed change electric motor through the speed change drive mechanism; and
a clutch provided at one end of said crankshaft for controlling the transmission of power from said crankshaft to said transmission,
wherein at least a part of said speed change electric motor and said speed change drive mechanism is disposed forwardly with respect to said clutch,
wherein said speed change drive mechanism includes an idle gear shaft integrally and coaxially provided with a large diameter gear and a small diameter gear which are operative to transmit rotational power of a motor drive shaft of said speed change drive mechanism to a shift spindle through speed reduction;
said transmission includes a main shaft to which power is inputted by said clutch, and a counter shaft for transmitting the rotational power of said main shaft to said output shaft; and
an arrangement of said motor drive shaft, said idle gear shaft and said shift spindle and an arrangement of said main shaft and said counter shaft are so set as to avoid an area between said crankshaft and said output shaft.

17. The internal combustion engine as set forth in claim 16 wherein the clutch on the one end of the crankshaft is a centrifugal clutch.

18. The internal combustion engine as set forth in claim 16, wherein
such a positional relationship is adopted that said idle gear shaft is substantially contained in a plane containing said motor drive shaft and said shift spindle, and the plane containing said motor drive shaft and said shift spindle is located substantially in parallel to and on a lower side of a plane containing said crankshaft and said output shaft; and
a plane containing said main shaft and said counter shaft is located substantially in parallel to and on an upper side of the plane containing said crankshaft and said output shaft.

* * * * *